United States Patent
Ueda

(10) Patent No.: US 10,632,836 B2
(45) Date of Patent: Apr. 28, 2020

(54) TANK MANUFACTURING METHOD AND TANK

(71) Applicant: TOYOTA JIDOSHA KABUSHIKI KAISHA, Toyota-shi, Aichi-ken (JP)

(72) Inventor: Naoki Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/915,463

(22) Filed: Mar. 8, 2018

(65) Prior Publication Data

US 2018/0290537 A1   Oct. 11, 2018

(30) Foreign Application Priority Data

Apr. 7, 2017  (JP) ................... 2017-076628

(51) Int. Cl.
  *B29C 70/32*   (2006.01)
  *B60K 15/03*   (2006.01)
  (Continued)

(52) U.S. Cl.
  CPC ...... *B60K 15/03006* (2013.01); *B29C 53/005* (2013.01); *B29C 53/602* (2013.01); *B29C 53/822* (2013.01); *B29C 70/30* (2013.01); *B29C 70/32* (2013.01); *B29C 70/56* (2013.01); *B29C 70/865* (2013.01); *F17C 1/06* (2013.01); *F17C 3/00* (2013.01); *F17C 13/003* (2013.01); *B29C 70/24* (2013.01); *B29K 2063/00* (2013.01); *B29K 2105/0881* (2013.01); *B29K 2105/20* (2013.01); *B29K 2307/04* (2013.01); *B29K 2309/08* (2013.01); *B29L 2031/7172* (2013.01);
  (Continued)

(58) Field of Classification Search
  None
  See application file for complete search history.

(56) References Cited

U.S. PATENT DOCUMENTS 2,848,133 A * 8/1958 Ramberg ............. B29C 53/602
                                                    220/590
3,374,807 A * 3/1968 Michael ................ B29C 70/16
                                                    138/144
(Continued)

FOREIGN PATENT DOCUMENTS

JP      9-203497 A * 8/1997
JP   2000-108213 A * 4/2000
(Continued)

OTHER PUBLICATIONS

Machine Translation PCT WO 2010/116529, Date Unknown.*
Machine Translation Japanese Patent 2000-108213, Date Unknown.*

*Primary Examiner* — Jeffry H Aftergut
(74) *Attorney, Agent, or Firm* — Oliff PLC

(57) ABSTRACT

A tank manufacturing method includes the steps of (a) forming a reinforcing layer before hardening, (b) embedding at least a part of a label into the reinforcing layer before hardening, and (c) winding glass fiber with thermosetting resin before hardening impregnated so as to cover the label to form a surface layer before hardening. The step (a) includes (a1) forming an inner layer before hardening, and (a2) forming an outer layer before hardening having a cover rate lower than the inner layer before hardening and lower than 100%, the outer layer before hardening being arranged on the inner layer before hardening.

5 Claims, 10 Drawing Sheets

(51) Int. Cl.
  *F17C 1/06* (2006.01)
  *B29C 53/60* (2006.01)
  *B29C 53/00* (2006.01)
  *F17C 13/00* (2006.01)
  *B29C 53/82* (2006.01)
  *B29C 70/30* (2006.01)
  *B29C 70/56* (2006.01)
  *B29C 70/86* (2006.01)
  *F17C 3/00* (2006.01)
  *B29C 70/24* (2006.01)
  *B29K 63/00* (2006.01)
  *B29K 105/08* (2006.01)
  *B29K 105/20* (2006.01)
  *B29K 307/04* (2006.01)
  *B29K 309/08* (2006.01)
  *B29L 31/00* (2006.01)

(52) U.S. Cl.
  CPC ........... *B60K 2015/03032* (2013.01); *B60K 2015/03046* (2013.01); *B60K 2015/03059* (2013.01); *B60K 2015/03315* (2013.01); *B60K 2015/03493* (2013.01); *F17C 2201/0109* (2013.01); *F17C 2201/056* (2013.01); *F17C 2203/012* (2013.01); *F17C 2203/0604* (2013.01); *F17C 2203/066* (2013.01); *F17C 2203/0607* (2013.01); *F17C 2203/0621* (2013.01); *F17C 2203/0624* (2013.01); *F17C 2203/0636* (2013.01); *F17C 2203/0643* (2013.01); *F17C 2203/0663* (2013.01); *F17C 2203/0665* (2013.01); *F17C 2203/0692* (2013.01); *F17C 2205/0305* (2013.01); *F17C 2205/0397* (2013.01); *F17C 2205/05* (2013.01); *F17C 2209/2154* (2013.01); *F17C 2221/012* (2013.01); *F17C 2221/033* (2013.01); *F17C 2223/0123* (2013.01); *F17C 2223/036* (2013.01); *F17C 2270/0168* (2013.01); *F17C 2270/0184* (2013.01); *Y02E 60/321* (2013.01)

(56) References Cited

U.S. PATENT DOCUMENTS

| | | |
|---|---|---|
| 5,534,318 A | 7/1996 | Andre De La Porte et al. |
| 2012/0012593 A1 | 1/2012 | Kuroiwa et al. |
| 2014/0131365 A1 | 5/2014 | Miyoshi et al. |

FOREIGN PATENT DOCUMENTS

| | | |
|---|---|---|
| JP | 2012-077780 A | 4/2012 |
| JP | 2013-011305 A | 1/2013 |
| JP | 2016-142349 A | 8/2016 |
| WO | WO-2010/116529 A1 * | 10/2010 |

* cited by examiner

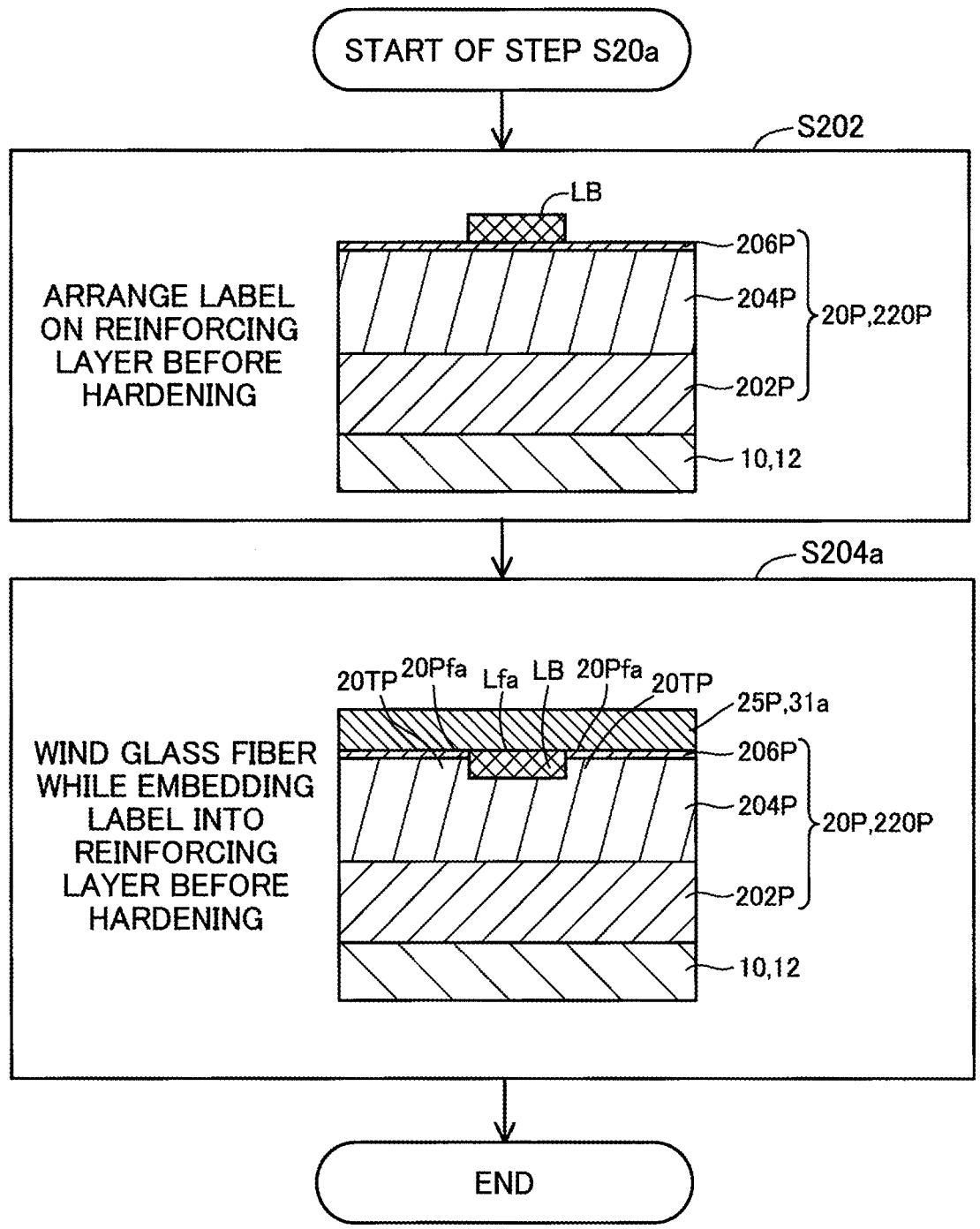

US 10,632,836 B2

TANK MANUFACTURING METHOD AND TANK

CROSS-REFERENCE TO RELATED APPLICATIONS

This application claims priority to Japanese Patent Application No. 2017-076628, filed Apr. 7, 2017, the disclosure of which is incorporated by reference herein in its entirety.

BACKGROUND

Field

The present disclosure relates to a technology of a tank.

Related Art

Conventionally, there is known a tank storing a fluid such as gas and liquefied gas (JP-A-2016-142349). In the JP-A-2016-142349, a tank includes a liner, a reinforcing layer formed of fiber reinforced resin on the liner, a label arranged on the reinforcing layer, and a surface layer including glass fiber arranged to cover the label.

In the conventional technology, a level difference may be occurred at a boundary portion between the label arranged on the reinforcing layer and the reinforcing layer positioned around the label. In such a case, when glass fiber is wound to cover the label, the glass fiber may bend due to a level difference. Here, the tank is filled with a fluid or the fluid flows out from the tank, whereby the tank is expanded and contracted repeatedly. Thus, the expansion and contraction of the tank may cause a crack at a bent portion of glass fiber or peel glass fiber. Therefore, there has been conventionally demanded a technology of suppressing bending of glass fiber due to a level difference.

SUMMARY

One aspect of the disclosure provides a tank manufacturing method. The tank manufacturing method includes the steps of (a) winding fiber with thermosetting resin before hardening impregnated on a liner to form a reinforcing layer before hardening, (b) embedding at least a part of a label into the reinforcing layer before hardening, and (c) winding glass fiber with the thermosetting resin before hardening impregnated so as to cover the label to form a surface layer before hardening, in which the step (a) includes (a1) forming an inner layer before hardening, and (a2) forming an outer layer before hardening that has a cover rate lower than the inner layer before hardening and lower than 100%, the cover rate being a percentage of a volume occupied by fiber with the thermosetting resin impregnated in space of the reinforcing layer before hardening, and that is arranged on the inner layer before hardening.

BRIEF DESCRIPTION OF DRAWINGS

FIG. 10 is a detailed flow diagram of Step S20*a*.

DETAILED DESCRIPTION

A. First Embodiment

Figure 1:
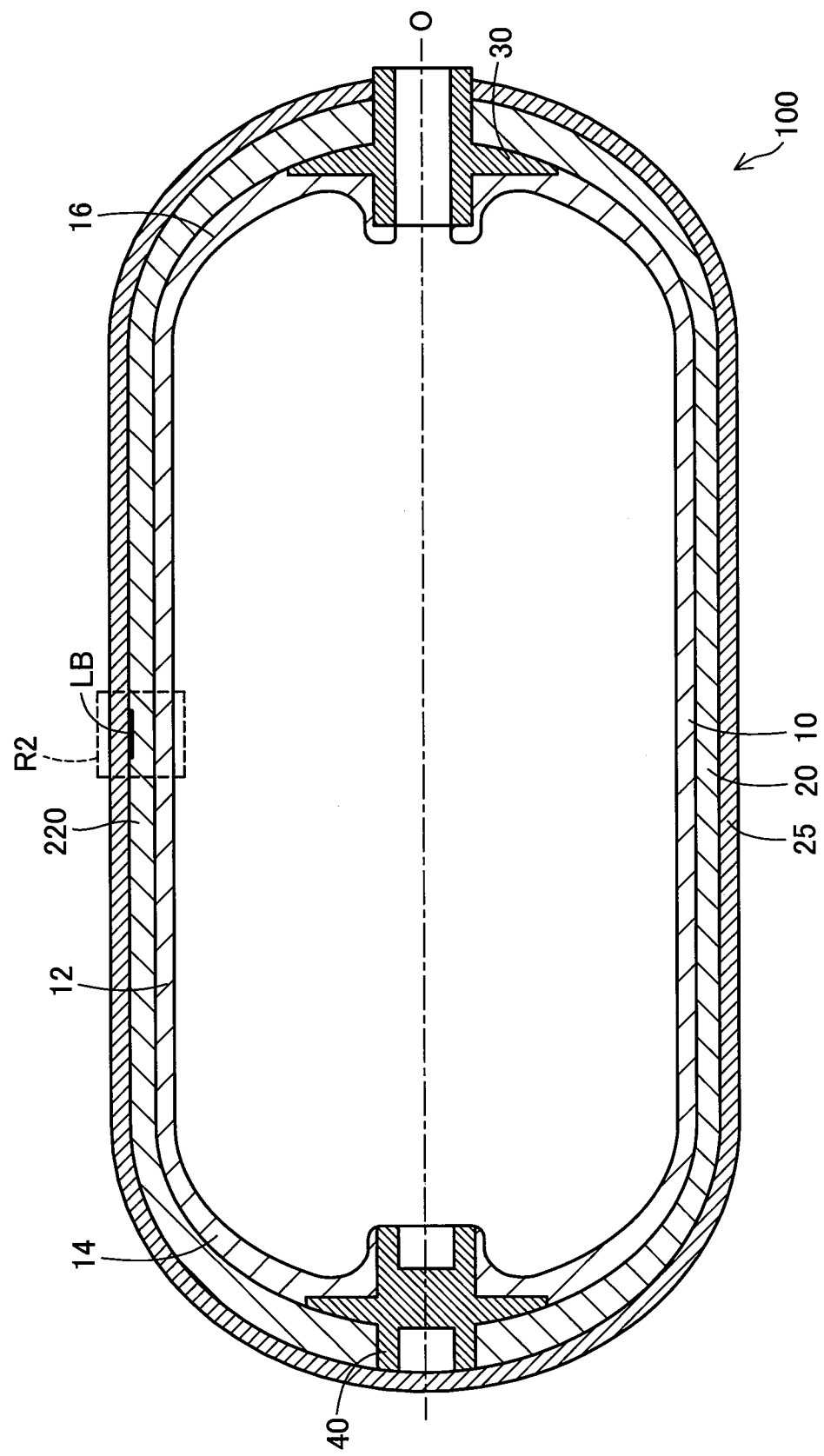
FIG. 1 is a section view illustrating a schematic configuration of a tank as a first embodiment of the present disclosure.

FIG. 1 is a section view illustrating a schematic configuration of a tank 100 as a first embodiment of the present disclosure. FIG. 1 is a diagram of the tank 100 in a section passing a label LB of the tank 100 among sections passing a central axis O of the tank 100 and being parallel to the central axis O. The tank 100 is manufactured by a tank 100 manufacturing method as the first embodiment of the present disclosure. The tank 100 is filled with compressed hydrogen gas, for example. The tank 100 is mounted on a fuel cell vehicle as a supply source for supplying hydrogen gas as anode gas to a fuel cell, for example.

The tank 100 is a hollow container. The tank 100 includes a liner 10 forming an element body of the tank 100, a reinforcing layer 20, a label LB, and a surface layer 25. The tank 100 further includes mouthpieces 30, 40 on the both sides in a direction along the central axis O (longitudinal direction) of the tank 100. Note that in the embodiment the central axis O of the tank 100 is same as the central axis O of the liner 10.

The liner 10 is formed of nylon resin. The liner 10 has a blocking feature to prevent a leak of hydrogen gas or the like filled in the inner space to the outside (so-called gas impermeability). Note that the liner 10 is not limited to nylon resin, and may be formed of other synthetic resin having fluid impermeability such as polyethylene resin or metal such as stainless steel. The liner 10 includes a cylindrical part 12 having a substantially cylindrical form, and substantially semi-spherical dome parts 14, 16 connected to the both ends in a longitudinal direction of the cylindrical part 12.

The reinforcing layer 20 is arranged on the liner 10 to cover the liner 10. The reinforcing layer 20 is formed of fiber reinforced resin. In the embodiment, the reinforcing layer 20 is formed of carbon fiber reinforced resin (CFRP) that is a composite material of thermosetting rein and carbon fiber. As thermosetting resin, there is used epoxy resin having an amine-based or anhydride-based hardening accelerator and a lubber strengthening agent. The thermosetting resin is not limited to epoxy resin, and there may be used other thermosetting resin such as unsaturated polyester rein.

The label LB is a plate member. The thickness of the label LB is about 1 mm to about 2 mm, for example. In the embodiment, the label LB is metallic, and is formed of aluminum, for example. Note that the label LB may be formed of metal other than aluminum (stainless steel or titan, for example) or an alloy, or may be formed of a material other than metal (synthetic resin, for example). The information identifying the tank 100 is described on the label LB. To be more specific, manufacturing information such as a manufacturing number and a manufacturing history (manufactured date, manufacturing plant, manufacturing line, etc.) is described on a surface of the label LB described later. The surface of the label LB is visible from the outside of the tank 100. The label LB is arranged on a cylindrical reinforcing layer 220 on the cylindrical part 12 in the reinforcing layer 20. The details of the label LB and the reinforcing layer 20 are described later.

The surface layer 25 is arranged on the reinforcing layer 20 to cover the label LB. To be more specific, the surface layer 25 is arranged on the reinforcing layer 20 to cover a surface of the reinforcing layer 20 and a surface of the label LB. The surface layer 25 is transparent or semitransparent, and the label LB arranged on the liner 10 side (inner side) than the surface layer 25 is visible from the outside of the tank 100. The surface layer 25 is formed of glass fiber reinforced resin (GFRP) that is a composite material of thermosetting rein and glass fiber. The surface layer 25 has higher impact resistant than the reinforcing layer 20. In the embodiment, epoxy resin same as the thermosetting resin forming the reinforcing layer 20 is used as the thermosetting resin. Note that the thermosetting resin is not limited to epoxy resin, and other thermosetting resin such as unsaturated polyester resin may be used. Moreover, there may be used epoxy resin different in characteristics (viscosity, gelling temperature, etc.) from thermosetting resin forming the reinforcing layer 20 by adjusting a hardening accelerator, a reinforcing agent, and the like. The surface layer 25 may be a single layer or a multiple layer.

The mouthpieces 30, 40 are attached respectively to two opening ends positioned at the both ends in a longitudinal direction of the liner 10. The mouthpiece 30 functions as an opening of the tank 100 and also functions as an attaching part for attaching pipes and valves onto the tank main body. Moreover, the mouthpieces 30, 40 also function as attaching parts for attaching the tank main body to a filament winding device when the reinforcing layer 20 and the surface layer 25 are formed.

Figure 2:
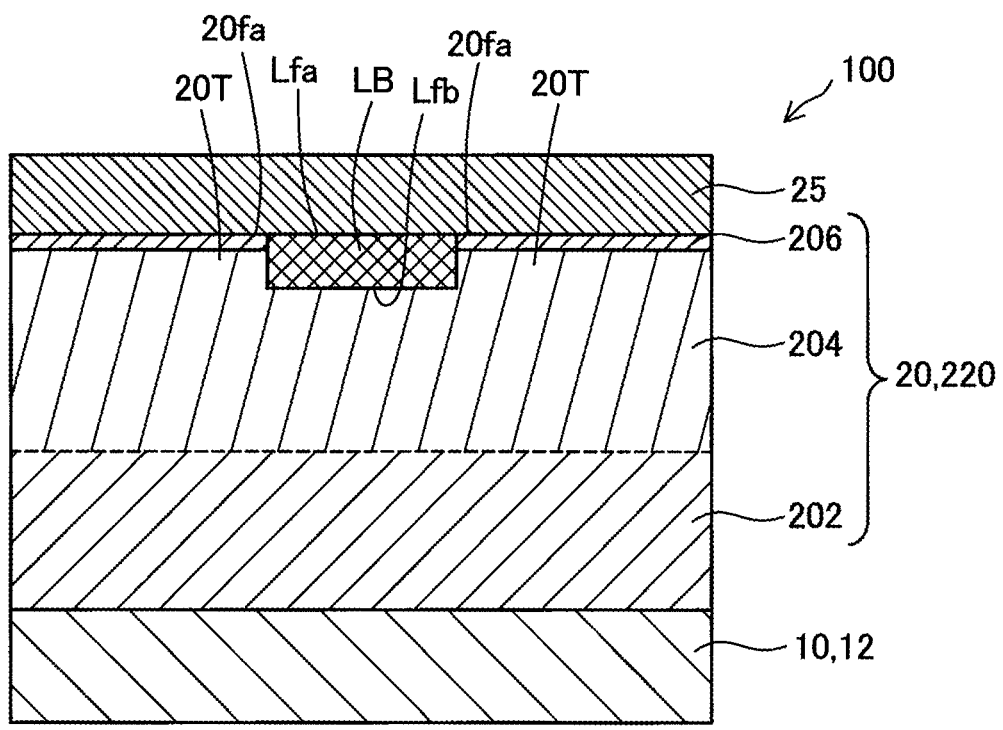
FIG. 2 is an enlarged view of an area R2 surrounded by a dotted line in FIG. 1.

FIG. 2 is an enlarged view of an area R2 surrounded by a dotted line in FIG. 1. The reinforcing layer 20 includes an inner layer 202, an outer layer 204, and an outermost layer 206. The inner layer 202 is a layer in contact with an outer surface of the liner 10. The inner layer 202 is formed of fiber reinforced resin wound on the liner 10 by helical winding or hoop winding described later. The inner layer 202 is formed by a plurality of laminated layers. The inner layer 202 has a higher cover rate than the outer layer 204. The cover rate indicates a percentage of the volume occupied by fiber reinforced resin in space where the reinforcing layer 20 (inner layer 202 here) is positioned. That is, when necessary minimum fiber reinforced resin covers an entire surface area of the liner 10 without any gap, the cover rate is 100%. For example, when the cover rate is 75%, the fiber reinforced resin occupies 75% of the volume and gaps (voids) occupy 25% of the volume in the space where the reinforcing layer 20 is positioned. In the embodiment, the cover rate indicates a cover rate in the cylindrical reinforcing layer 220 arranged on the cylindrical part 12 in the reinforcing layer 20. This is because in the cylindrical reinforcing layer 220 arranged on the cylindrical part 12, the arrangement of fiber reinforced resin is simpler than in the reinforcing layer 20 arranged on the dome parts 14, 16, and the cover rate is calculated more easily regarding the cylindrical reinforcing layer 220 than the reinforcing layer arranged on the dome parts 14, 16. The cover rate of the inner layer 202 is 100% or higher than 100%. Moreover, the inner layer 202 is formed by a plurality of laminated layers (10 layers to 20 layers, for example).

The outer layer 204 is arranged on the inner layer 202. The outer layer 204 is formed of fiber reinforced resin wound on the inner layer 202 by helical winding described later. Note that the outer layer 204 may be formed by combination of helical winding and hoop winding, or formed by hoop winding. The cover rate of the outer layer 204 is lower than that of the inner layer 202 and is lower than 100%. For example, the cover rate of the outer layer 204 may be in a range of 50% or higher but lower than 100%. It is preferably in a range of 70% or higher but 90% or lower to sufficiently secure voids to which fiber is moved when the label LB is embedded. In the embodiment, the cover rate of the outer layer 204 is about 75%. When the lower limit of the cover rate of the outer layer 204 is 50%, it is possible to reduce a possibility of reducing the strength of the tank 100. The outer layer 204 is formed by a plurality of laminated layers (8 layers to 15 layers, for example). The outer layer 204 preferably has a larger thickness than the label LB. For example, the thickness of the outer layer 204 may be double or larger, or equal to or smaller than 20 times the thickness of the label LB. In the embodiment, the outer layer 204 has a thickness of about 13 mm by a plurality of layers.

The outermost layer 206 is a layer for arranging a shape of the reinforcing layer 20. The outermost layer 206 is formed of fiber reinforced resin wound on the outer layer 204 by hoop winding described later. The cover rate of the outermost layer 206 is higher than that of the outer layer 204, and is 100%, for example. The outermost layer 206 has higher tension added to a fiber bundle when the fiber bundle with resin impregnated is wound on the outer layer 204 than tension added to a fiber bundle when the outer layer 204 is formed. For example, the tension added to the fiber bundle wound when the outer layer 204 is formed is 15N to 30N, while the tension added to the fiber bundle wound when the outermost layer 206 is formed is 50N to 70N. The outermost layer 206 is formed of one layer. The outermost layer 206 may be omitted or formed by a plurality of layers.

The label LB is arranged on the reinforcing layer 20. In the embodiment, the label LB is arranged on the cylindrical reinforcing layer 220 formed on the cylindrical part 12 in the reinforcing layer 20. The label LB arranged on the reinforcing layer 20 indicates the state in which a surface LFa of the label LB is not covered by the reinforcing layer 20 and is exposed to the reinforcing layer 20 while a back surface Lfb of the label LB is in contact with the reinforcing layer 20. Moreover, at least one part of the label LB is embedded in the reinforcing layer 20 (cylindrical reinforcing layer 220, to be more specific). In the embodiment, a part other than the surface Lfa of the label LB is embedded in the reinforcing layer 20. To be more specific, the label LB is embedded in the outermost layer 206 and the outer layer 204. Moreover, the surface LFa of the label LB and a surface 20fa of a surrounding reinforcing layer 20T around the label LB in the reinforcing layer 20 are positioned on the substantially same surface (surface along a circumferential direction of the reinforcing layer 20), for example. That is, when the tank 100 is cut on a face passing the central axis O of the tank 100 and being parallel to the central axis O, the face passing the label LB (with the section illustrated in FIG. 2), the surface Lfa of the label LB and the surface 20fa of the surrounding reinforcing layer 20T are positioned on the substantially same plane. That is, the boundary portion between the surface Lfa of the label LB and the reinforcing layer 20 forms a smooth face with any level difference. In the embodiment, substantially same indicates same and deviation due to tolerance that may be occurred in the manufacturing procedure.

Figure 3:
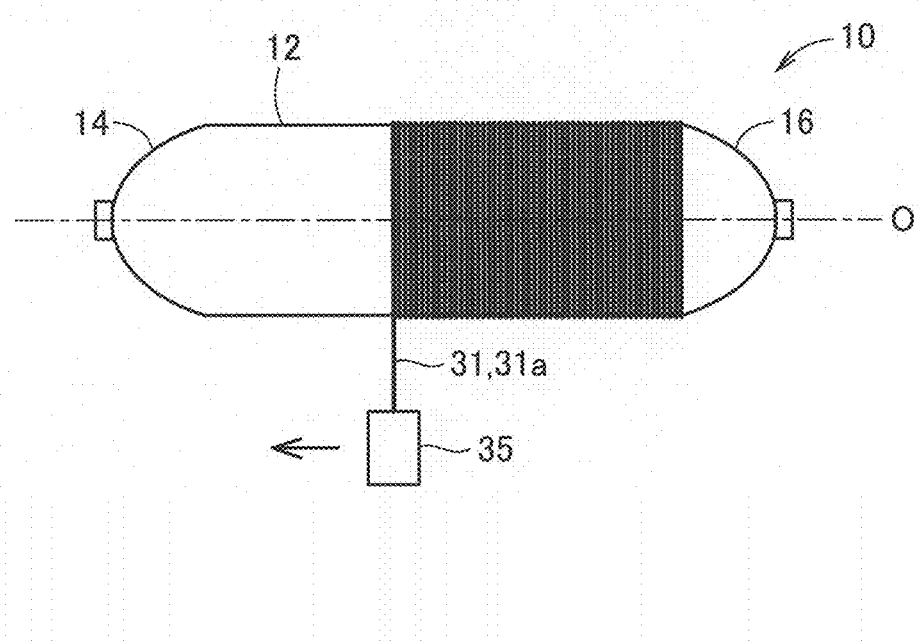
FIG. 3 is a diagram for explaining hoop winding of a fiber bundle.

FIG. 3 is a diagram for explaining hoop winding of fiber bundles 31, 31a. The fiber bundle 31 is a fiber bundle with thermosetting resin impregnated to form the reinforcing layer 20. The fiber bundle 31 is a carbon fiber bundle, for example. The fiber bundle 31a is a fiber bundle with thermosetting resin impregnated to form the surface layer 25. The fiber bundle 31a is a glass fiber bundle, for example. The fiber bundles 31, 31a with thermosetting resin impregnated are subjected to heating processing, whereby the thermosetting resin is hardened to form fiber reinforced resin. The fiber bundles 31, 31a are supplied from a fiber supply port 35 to the liner 10 and wound on the liner 10. The fiber bundles 31, 31a are wound on the cylindrical part 12 of the liner 10 by hoop winding. In hoop winding, the fiber bundles 31, 31a are wound so that they are substantially perpendicular to the central axis O of the liner 10, while the winding position (in other words, a position of the fiber supply port 35) is moved to a central axis O direction. In other words, the hoop winding is a method of winding the fiber bundle 31 so that an angle formed by the central axis O and a winding direction of the fiber bundles 31, 31a is substantially perpendicular. Here, "substantially perpendicular" includes both 90° and an angle close to 90° that may be occurred by deviation of a fiber winding position for preventing overlapping of the fiber bundles 31.

Figure 4:
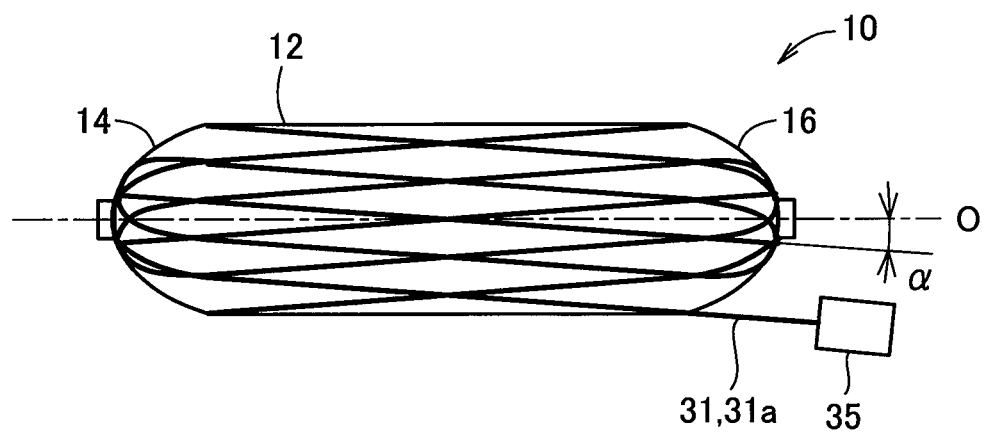
FIG. 4 is a diagram for explaining helical winding of a fiber bundle.

FIG. 4 is a diagram for explaining helical winding of the fiber bundles 31, 31a. The fiber bundles 31, 31a are wound over the cylindrical part 12 and the dome parts 14, 16 by helical winding. In helical winding, the fiber bundles 31, 31a are wound so that they have a given angle relative to the central axis O of the cylindrical part 12, while the winding position is moved around the liner 10. In other words, the helical winding is a method of winding the fiber bundles 31, 31a so that an angle α formed by the central axis O and the winding direction of the fiber bundles 31, 31a is a given angle (any angle in a range of 10° to 30°, for example). The given angle may be determined arbitrarily. For example, when the given angle is small, it is possible to achieve a winding method (so-called low angle helical winding) allowing a turn of a winding direction of the fiber bundles 31, 31a in the dome parts 14, 16 before the fiber bundles 31, 31a are wound around the central axis O once. By contrast, when a given angle is large, it is possible to achieve a winding method (so-called high angle helical winding) allowing the fiber bundle 31, 31a to be wound around the central axis O at least once in the cylindrical part 12 before a turn of a winding direction of the fiber bundle 31, 31a in the dome parts 14, 16.

In this manner, the fiber bundles 31, 31a are wound on the liner 10 by hoop winding and helical winding, whereby a reinforcing layer before hardening and a surface layer before hardening are formed on the liner 10.

Figure 5:
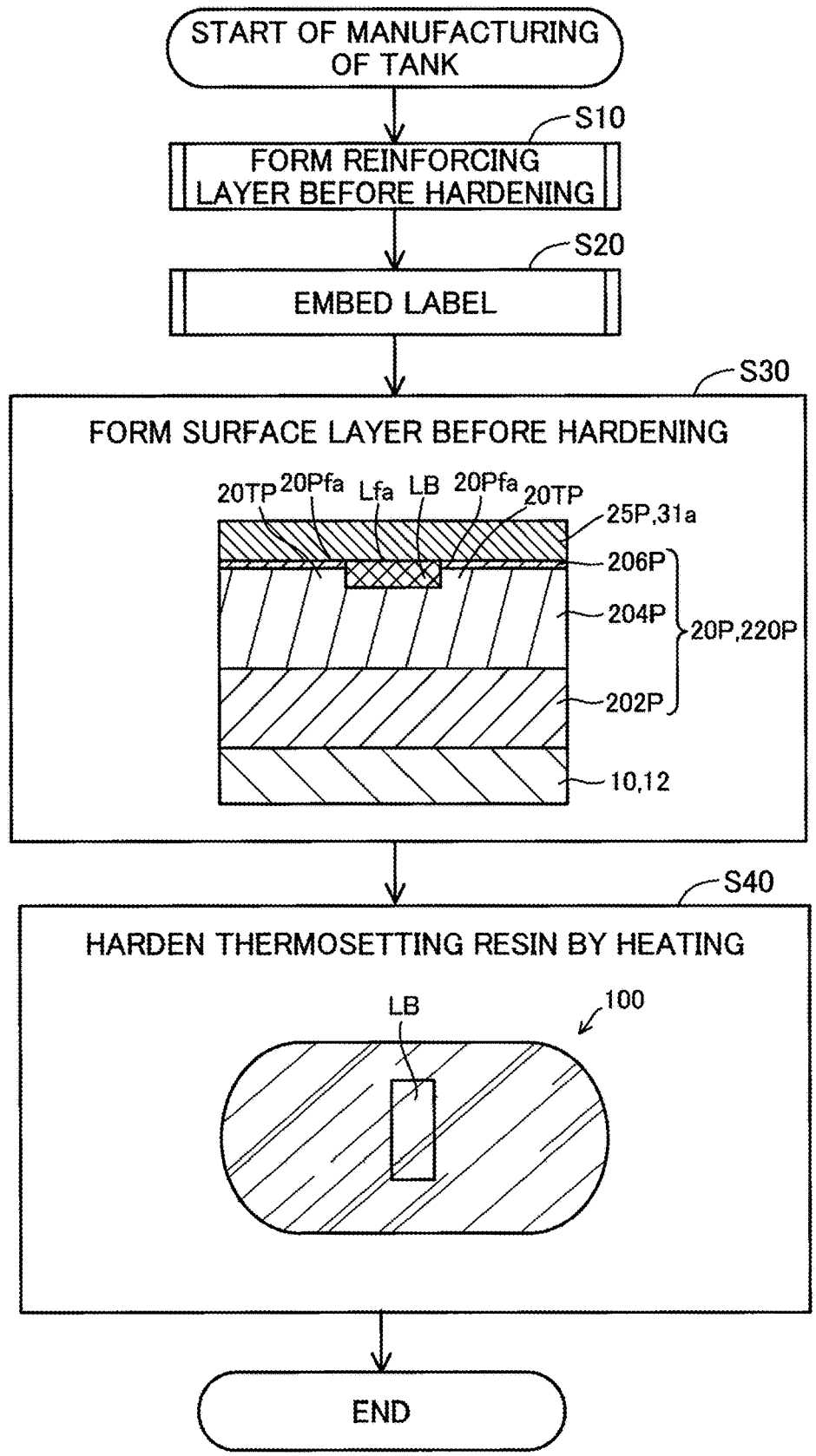
FIG. 5 is a flow diagram for explaining a tank manufacturing procedure.
Figure 6:
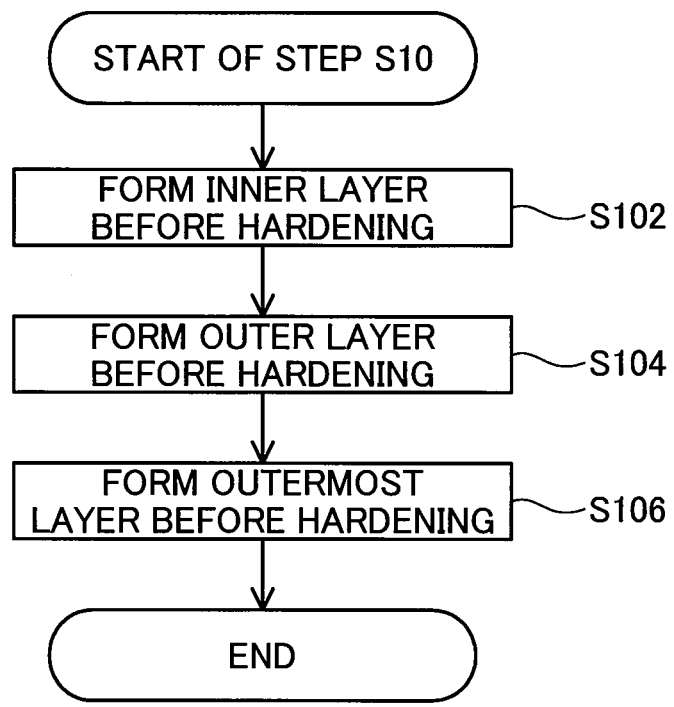
FIG. 6 is a detailed flow diagram of Step S10.
Figure 7:
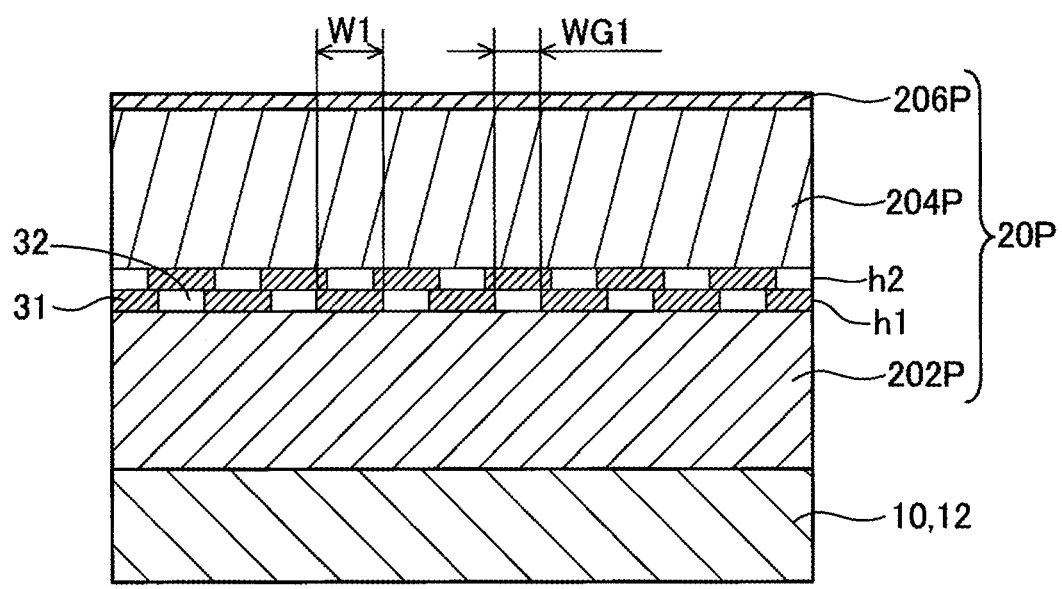
FIG. 7 is a diagram for explaining Step S10.
Figure 8:
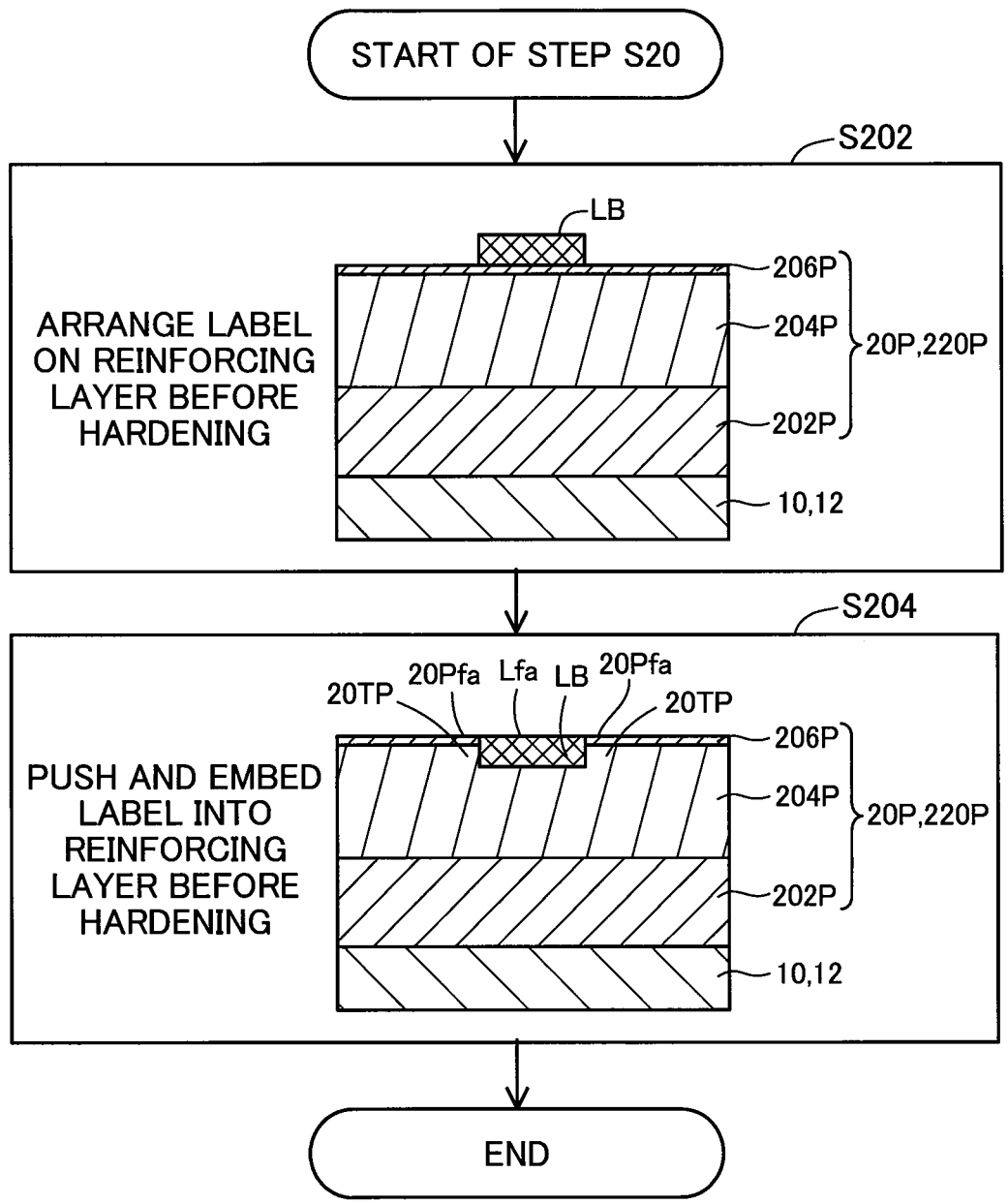
FIG. 8 is a detailed flow diagram of Step S20.

FIG. 5 is a flow diagram for explaining a tank 100 manufacturing procedure. FIG. 6 is a detailed flow diagram of Step S10. FIG. 7 is a diagram for explaining Step S10. FIG. 8 is a detailed flow diagram of Step S20. FIG. 7 schematically illustrates a section of a reinforcing layer before hardening 20P that is formed on the liner 10, and schematically illustrates a layer h1 arranged in contact with an inner layer before hardening 202P of an outer layer before hardening 204P, the fiber bundle 31 on a layer h2 arranged on the layer h1, and voids 32.

First, the fiber bundle 31 with thermosetting resin before hardening impregnated is wound on the liner 10 to form a reinforcing layer before hardening 20P (FIG. 7) (Step S10).

As illustrated in FIG. 6, at Step S10, the fiber bundle 31 with thermosetting resin before hardening impregnated is first wound on the outer surface of the liner 10 to form the inner layer before hardening 202P (FIG. 7) (Step S102). As fiber of the fiber bundle 31 used at Step S102, carbon fiber is used. The inner layer before hardening 202P is a layer that becomes the inner layer 202 by the following heating processing. The inner layer before hardening 202P is formed by winding the fiber bundle 31 on the liner 10 by helical winding or hoop winding. The inner layer before hardening 202P is formed by winding the fiber bundle 31 on the outer surface of the liner 10 so that the cover rate is 100% or larger than 100%. That is, the inner layer before hardening 202P is a dense layer without any void 32. The cover rate in the reinforcing layer before hardening 20P indicates a percentage of the volume occupied by the fiber bundle 31 with the thermosetting resin impregnated in the space where the reinforcing layer before hardening 20P is positioned.

After Step S102, the fiber bundle 31 with thermosetting resin before hardening impregnated is wound on the inner layer before hardening 202P to form the outer layer before hardening 204P (FIG. 7) (Step S104). As fiber of the fiber bundle 31 used at Step S104, carbon fiber is used. The outer layer before hardening 204P is a layer that becomes the outer layer 204 by the following heating processing. The outer layer before hardening 204P is formed by winding the fiber bundle 31 on the outer layer before hardening 204P by helical winding. The outer layer before hardening 204P is formed by a plurality of laminated layers, and has a larger thickness than the label LB. For example, the thickness of the outer layer before hardening 204P may be double or larger, or equal to or smaller than 20 times the thickness of the label LB. In the embodiment, the outer layer before hardening 204P has a thickness of about 13 mm by a plurality of layers.

The outer layer before hardening 204P is formed by winding the fiber bundle 31 on the inner layer before hardening 202P so that the cover rate is lower than that of the inner layer before hardening 202P and is smaller than 100%. That is, the outer layer before hardening 204P is a layer having the voids 32. For example, when the fiber bundle 31 is wound on the inner layer before hardening 202P, it is spaced from the adjacent fiber bundle 31 with a gap, whereby the cover rate may be smaller than 100%. Moreover, it is possible to adjust the cover rate by adjusting a size of the gap. That is, it is possible to reduce a cover rate by increasing a size of the gap. In the embodiment, the cover rate of the outer layer before hardening 204P may be in a range of 50% or higher but lower than 100%. It is preferably in a range of 70% or higher but 90% or lower to sufficiently secure the void 32 allowing movement of the fiber bundle 31 when the label LB is embedded. When the lower limit of the cover rate of the outer layer before hardening 204P is 50%, it is possible to reduce a possibility of reducing the strength of the tank 100.

The method of calculating a cover rate of the outer layer before hardening 204P will be described based on FIG. 7. In FIG. 7, there is exemplified the layer h1 in the outer layer before hardening 204P formed by a plurality of layers. In the layer h1, the fiber bundle 31 is wound with a gap (void) 32 of a width WG1 from the adjacent fiber bundle 31. When the width of the fiber bundle 31 is a width W1, the cover rate in the layer h1 is calculated by 100×W1/(W1+WG1)%. The cover rate in each layer of the outer layer before hardening 204P is about 75% in the embodiment.

As illustrated in FIG. 6, after Step S104, the fiber bundle 31 with thermosetting resin before hardening impregnated is wound on the outer layer before hardening 204P to form an outermost layer before hardening 206P (FIG. 7) (Step S106). As fiber of the fiber bundle 31 used at Step S106, carbon fiber is used. The outermost layer before hardening 206P is a layer that becomes the outermost layer 206 by the following heating processing. The outermost layer before hardening 206P is formed by winding the fiber bundle 31 on the liner 10 by helical winding. The outermost layer before hardening 206P is formed by winding the fiber bundle 31 on the outer layer before hardening 204P so that the cover rate is 100%. That is, the outermost layer before hardening 206P is a dense layer without any void 32. Step S10 is finished by performing Step S102 to Step S106.

As illustrated in FIG. 5, the metal label LB is embedded in the reinforcing layer before hardening 20P after Step S10 (Step S20). To be more specific, as illustrated in FIG. 8, the label LB is first arranged on the reinforcing layer before hardening 20P (Step S202). In the embodiment, the label LB is arranged on a cylindrical reinforcing layer before being reinforced 220P positioned on the cylindrical part 12 in the reinforcing layer before hardening 20P. After Step S202, the label LB is pushed into the reinforcing layer before hardening 20P to be embedded in the reinforcing layer before hardening 20P (Step S204). In the embodiment, at Step S204, the label LB is pushed and embedded into the reinforcing layer before hardening 20P until the surface Lfa of the label LB is positioned on the substantially same surface as a surface 20Pfa of a surrounding reinforcing layer before hardening 20TP positioned around the label LB embedded in the reinforcing layer before hardening 20P. That is, the boundary portion between the surface Lfa of the label LB and the reinforcing layer before hardening 20P forms a smooth face without any level difference. The method of pushing the label LB into the reinforcing layer before hardening 20P is, for example, a method of pushing it by an operator using a hand, a method of pushing it with the use of a pushing tool such as a roller, or a method of pushing it using the fiber bundle 31a forming the surface layer before hardening described later. When the label LB has a flat plate shape in side view, this push-in deforms the side view to a circular shape to be along a surface shape of the cylindrical reinforcing layer before being reinforced 220P. Moreover, in the state before being embedded, the label LB may have a circular shape along a surface shape of the cylindrical reinforcing layer before being reinforced 220P in side view.

As described above, Step S20 is a step for embedding at least a part of the label LB into the reinforcing layer before hardening 20P from the outer surface side of the reinforcing layer before hardening 20P.

As illustrated in FIG. 5, a surface layer before hardening 25P is formed after Step S20 (Step S30). To be more specific, the fiber bundle 31a with thermosetting resin before hardening impregnated is wound so as to cover the label LB and the reinforcing layer before hardening 20P to form the surface layer before hardening 25P. The surface layer before hardening 25P is a layer that becomes the surface layer 25 by the following heating processing. The surface layer before hardening 25P is formed by winding the fiber bundle 31a on the liner 10 by helical winding or hoop winding.

After Step S30, the thermosetting resin of each layer 20P, 25P is hardened by heating (Step S40). Step S40 is performed by storing the liner 10 on which the reinforcing layer before hardening 20P and the surface layer before hardening 25P are arranged in a hollow furnace and heating the reinforcing layer before hardening 20P and the surface layer before hardening 25P to a hardening temperature of the thermosetting resin, for example. In this manner, there is manufactured the tank 100 in which the label LB is embedded in the reinforcing layer 20. Here, the layers 202P, 204P, 206P of the reinforcing layer before hardening 20P is different from the layers 202, 204, 206 of the reinforcing layer 20 only in whether the thermosetting resin is hardened. Therefore, the cover rate of the layers 202P, 204P, 206P of the reinforcing layer before hardening 20P is substantially same as the cover rate of the layers 202, 204, 206 of the reinforcing layer 20 after hardening. Moreover, also in the surroundings in which the label LB is embedded in the reinforcing layer 20, the thickness of the label LB is sufficiently smaller than the thickness of the reinforcing layer 20. Thus, even when the label LB is pushed into the outer layer before hardening 204P and the outermost layer before hardening 206P, the cover rate of the outer layer 204 and the outer layer before hardening 204P positioned around the label LB is almost same.

In the above-described first embodiment, the cover rate of the outer layer before hardening 204P formed at Step S104 is lower than 100%. Thus, the outer layer before hardening 204P has the void 32. In this manner, when the label LB is embedded into the reinforcing layer before hardening 20P, the fiber bundle 31 of the outer layer before hardening 204P pushed in by the label LB may be pushed aside to the void 32, which makes it possible to easily embed the label LB into the reinforcing layer before hardening 20P. Therefore, it is possible to reduce a level difference occurred at the boundary portion between the label LB and the reinforcing layer before hardening 20P positioned around the label LB, which suppresses bending of the fiber bundle 31a at the boundary portion when the fiber bundle 31a that is a bundle of glass fiber is wound to form the outermost layer before hardening 206P. That is, in the tank 100, it is possible to reduce a level difference occurred at the boundary portion between the label LB and the reinforcing layer 20 positioned around the label LB, which suppresses bending of the glass fiber 31a at the boundary portion. When the bending of the fiber bundle 31a at the boundary portion is suppressed, it is possible to reduce a possibility that the surface layer 25 around the label LB is cracked or peeled even when hydrogen gas is filled in the tank 100 or hydrogen gas flows out repeatedly.

Moreover, in the above-described first embodiment, the thickness of the outer layer before hardening 204P is larger than the thickness of the label LB. In this manner, a larger part of the label LB may be easily embedded into the reinforcing layer before hardening 20P. That is, in the tank 100, a larger part of the label LB may be easily embedded into the reinforcing layer 20. In the above-described first embodiment, at Step S204, the label LB is pushed and embedded into the reinforcing layer before hardening 20P until the surface Lfa of the label LB is positioned on the substantially same surface as the surface 20Pfa of the surrounding reinforcing layer before hardening 20TP. In this manner, it is possible to reduce a level difference occurred at the boundary portion between the label LB and the surrounding reinforcing layer before hardening 20TP, which further suppresses bending of the fiber bundle 31a at the boundary portion when the fiber bundle 31a is wound. That is, also in the manufactured tank 100, the surface Lfa of the label LB is positioned on the substantially same surface as the surface 20fa of the surrounding reinforcing layer 20T, which further reduces a level difference occurred at the boundary portion between the label LB and the surrounding reinforcing layer 20T. In this manner, it is possible to further suppress bending of the glass fiber 31a at the boundary portion in the tank 100.

Moreover, in the first embodiment, the label LB is formed of metal, and thus the label LB is harder than the fiber bundle 31 that is a bundle of carbon fiber of the reinforcing layer before hardening 20P. In this manner, when the label LB is pushed and embedded into the reinforcing layer before hardening 20P, the fiber bundle 31 of the reinforcing layer before hardening 20P may be easily pushed aside by the label LB. Therefore, it is possible to embed the label LB into the reinforcing layer before hardening 20P more easily.

B. Second Embodiment

Figure 9:
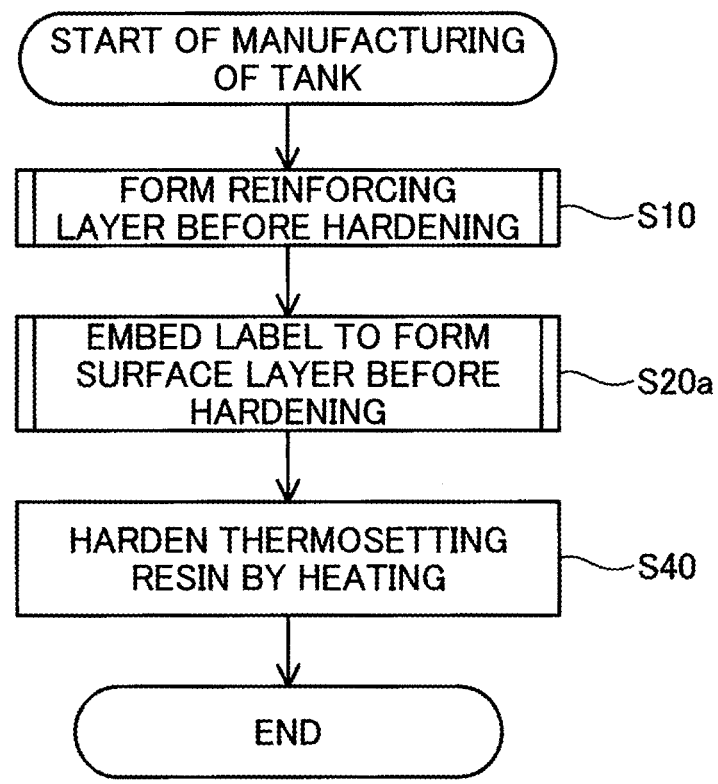
FIG. 9 is a flow diagram for explaining a tank manufacturing procedure according to a second embodiment.

FIG. 9 is a flow diagram for explaining the tank 100 manufacturing procedure according to the second embodiment. FIG. 10 is a detailed flow diagram of Step S20a. The manufactured tank 100 is same in the first embodiment and in the second embodiment. The manufacturing procedure of the tank 100 in the second embodiment is different from the manufacturing procedure of the tank 100 in the first embodiment in that Step S20 and Step S30 of the first embodiment are performed at Step S20a of the second embodiment. Other steps are same as the steps of the first embodiment, and thus the same steps are represented with same symbols and the explanation thereof is omitted.

As illustrated in FIG. 9, after Step S10, the metal label LB is embedded into the reinforcing layer before hardening 20P, and the surface layer before hardening 25P is formed (Step S20a). At Step S20a, as illustrated in FIG. 10, the label LB is first arranged on the reinforcing layer before hardening 20P (Step S202). Next, the fiber bundle 31a that is a bundle of glass fiber with thermosetting resin before hardening impregnated is wound on the label LB and the reinforcing layer before hardening 20P, while the label LB is embedded into the reinforcing layer before hardening 20P (Step S204a). To be more specific, when the fiber bundle 31a is wound on the label LB, tension added to the fiber bundle 31a is made higher than tension added to the fiber bundle 31a when the fiber bundle 31a is wound on a part different from the label LB. In this manner, the label LB is pushed in by the fiber bundle 31a wound on the label LB to be embedded into the reinforcing layer before hardening 20P. The tension added to the fiber bundle 31a may be adjusted by a tension control dancer (not illustrated), for example. The tension control dancer adjusts tension by displacing a position of the fiber bundle 31a being carried. As illustrated in FIG. 9, Step S40 is performed after Step S20a, whereby the tank 100 is manufactured.

The above-described second embodiment exerts the same effects as the first embodiment in the points of the same configuration and manufacturing procedure. For example, the cover rate of the outer layer before hardening 204P formed at Step S104 is lower than 100%. Thus, the outer layer before hardening 204P has the void 32. In this manner, when the label LB is embedded into the reinforcing layer before hardening 20P, the fiber bundle 31 of the outer layer before hardening 204P pushed in by the label LB may be pushed aside to the void 32, which makes it possible to easily embed the label LB into the reinforcing layer before hardening 20P.

Moreover, in the above-described second embodiment, when the fiber bundle 31a is wound to form the surface layer before hardening 25P, the label LB may be embedded into the reinforcing layer before hardening 20P. In this manner, it is possible to reduce manufacturing time of the tank 100, as compared with the method of embedding the label LB into the reinforcing layer before hardening 20P using a roller or the like before winding the fiber bundle 31a. In the above-describe second embodiment, when the fiber bundle 31a is wound on the label LB, tension added to the fiber bundle 31a is made higher than tension added to the fiber bundle 31a when the fiber bundle 31a is wound on another part different from the label LB, whereby the label LB is embedded into the reinforcing layer before hardening 20P. However, the embodiment is not limited thereto. For example, when the fiber bundle 31a is wound on the label LB and on another part different from the label LB, the tension added to the fiber bundle 31a may be constant without being changed. In this case, constant tension allowing the label LB to be pushed into the reinforcing layer before hardening 20P may be added to the fiber bundle 31a.

C. Modifications

Note that the present disclosure is not limited to the above-described examples and embodiments, and may be implemented in various aspects without departing from the scope of the present disclosure. For example, the following modifications are also possible.

C-1. First Modification

In the above-described embodiments, the outer layer before hardening 204P (outer layer 204) has a larger thickness than the label LB. However, it may have a thickness equal to or smaller than the thickness of the label LB. In the above-described embodiments, the label LB is embedded into the reinforcing layer before hardening 20P until the surface Lfa of the label LB is positioned on the substantially same surface as the surface 20fa of the surrounding reinforcing layer before hardening 20TP. However, the embodiment is not limited thereto. For example, the surface Lfa of the label LB may not be positioned on the substantially same surface as the surface 20fa of the surrounding reinforcing layer before hardening 20TP. For example, in a thickness direction of the label LB, the lower side portion of the label LB may be embedded in the surrounding reinforcing layer before hardening 20TP, while the upper side portion of the label LB may project from the surrounding reinforcing layer before hardening 20TP. Even in this manner, the cover rate in the outer layer before hardening 204P and the outer layer 204 is lower than 100%, whereby it is possible to easily embed a part of the label LB into the reinforcing layer before hardening 20P (reinforcing layer 20). Therefore, it is possible to reduce a level difference occurred at the boundary portion between the label LB and the reinforcing layer before hardening 20P around the label LB, as compared with the case in which the entire of the label LB is positioned on the upper side than the reinforcing layer before hardening 20P. In this manner, it is possible to suppress bending of the fiber bundle 31a at the boundary portion when the fiber bundle 31a that is a bundle of glass fiber is wound to form the outermost layer before hardening 206P.

C-2. Second Modification

In the above-described embodiments, the tank 100 is a tank for filling compressed hydrogen gas. However, it may be used to fill various kinds of fluid such as gas (methane gas, for example) and liquid (liquefied gas or water, for example).

C-3. Third Modification

In the above described embodiments, the label LB is embedded in the cylindrical reinforcing layer 220. However, the embodiment is not limited thereto. For example, the label LB may be embedded in a dome reinforcing layer positioned on the dome parts 14, 16 in the reinforcing layer 20. In such a case, the cover rate of the outer layer 204 of the dome reinforcing layer is lower than 100%. Moreover, the lower limit of the cover rate of the outer layer 204 of the dome reinforcing layer may be 50%. Furthermore, the cover rate of the outer layer 204 of the dome reinforcing layer may be 70% or higher but 90% or lower.

The present disclosure is not limited to the above-described embodiments, examples, and modifications, and may be achieved by various configurations without departing from the scope of the present disclosure. Moreover, when the technical features are not explained as necessary in the specification, they may be deleted appropriately. The present disclosure may be implemented by aspects described below.

(1) One aspect of the disclosure provides a tank manufacturing method. The tank manufacturing method includes the steps of (a) winding fiber with thermosetting resin before hardening impregnated on a liner to form a reinforcing layer before hardening, (b) embedding at least a part of a label into the reinforcing layer before hardening, and (c) winding glass fiber with the thermosetting resin before hardening impregnated so as to cover the label to form a surface layer before hardening, in which the step (a) includes (a1) forming an inner layer before hardening, and (a2) forming an outer layer before hardening that has a cover rate lower than the inner layer before hardening and lower than 100%, the cover rate being a percentage of a volume occupied by fiber with the thermosetting resin impregnated in space of the reinforcing layer before hardening, and that is arranged on the inner layer before hardening. In the aspect, the cover rate of the outer layer before hardening is lower than 100%, and thus the outer layer before hardening has voids. In this manner, when at least a part of the label is embedded into the reinforcing layer before hardening, the fiber of the outer layer before hardening pushed in by the label may be pushed aside to the voids, which makes it possible to easily embed a part of the label into the reinforcing layer before hardening. Thus, it is possible to reduce a level difference occurred at the boundary portion between the label and the reinforcing layer before hardening around the label, which suppresses bending of the glass fiber at the boundary portion when the glass fiber is wound.

(2) In the above-described aspect, the step (b) may include (b1) arranging the label on the reinforcing layer before hardening, and (b2) embedding at least a part of the label into the reinforcing layer before hardening by the glass fiber wound on the label at the step (c), in which the step (b2) may include making tension added to the glass fiber when the glass fiber is wound on the label higher than tension added to the glass fiber when the glass fiber is wound on another part different from the label. In the above-described aspect, it is possible to embed at least a part of the label into the reinforcing layer before hardening when the glass fiber is wound.

(3) In the above-described aspect, a thickness of the outer layer before hardening formed by the step (a2) may be larger than a thickness of the label. In the aspect, it is possible to easily embed a larger part of the label into the reinforcing layer before hardening.

(4) In the above-described aspect, the step (b) may be embedding the label into the reinforcing layer before hardening until a surface of the label is positioned on a substantially same surface as a surface of a surrounding reinforcing layer before hardening positioned around the label embedded in the reinforcing layer before hardening. In the above-described aspect, it is possible to reduce a level difference occurred at the boundary portion between the label and the surrounding reinforcing layer around the label, which further suppresses bending of the glass fiber at the boundary portion when the glass fiber is wound.

(5) In the above-described aspect, the label embedded into the reinforcing layer before hardening by the step (b) may be formed of metal. In the above-described aspect, the label is formed of metal, and thus the label is harder than fiber of the reinforcing layer before hardening. Thus, when the label is pushed into the reinforcing layer before hardening to embed at least a part of the label into the reinforcing layer before hardening, the fiber of the reinforcing layer before hardening may be easily pushed aside by the label. In this manner, it is possible to embed at least a part of the label into the reinforcing layer before hardening more easily.

(6) Another aspect of the disclosure provides a tank. The tank includes a liner, a reinforcing layer formed of fiber reinforced resin that is arranged on the liner, a label arranged on the reinforcing layer, and a surface layer formed of glass fiber reinforced resin that is arranged to cover the label, in which the reinforcing layer includes an inner layer, and an outer layer that has a cover rate smaller than the inner layer and smaller than 100%, the cover rate being a percentage of a volume occupied by the fiber reinforced resin in space of the reinforcing layer, and that is arranged on the inner layer, and at least a part of the label is embedded in the reinforcing layer. In the above-described aspect, the cover rate of the outer layer is lower than 100%, and thus it is possible to easily embed at least a part of the label into the reinforcing layer. In this manner, it is possible to reduce a level difference occurred at the boundary portion between the label and the reinforcing layer around the label, which suppresses bending of the glass fiber at the boundary portion.

(7) In the above-described aspect, the outer layer may have a larger thickness than the label. In the above-described aspect, it is possible to easily embed a larger part of the label into the reinforcing layer.

(8) In the above-described aspect, a surface of the label and a surface of a surrounding reinforcing layer positioned around the label in the reinforcing layer may be positioned on a substantially same surface. In the above-described aspect, it is possible to reduce a level difference occurred at the boundary portion between the label and the reinforcing layer (surrounding reinforcing layer) around the label, which suppresses bending of the glass fiber at the boundary portion.

(9) In the above-described aspect, the label may be formed of metal. In the above-described aspect, the label is formed of metal, and thus the label is harder than fiber of the reinforcing layer. Thus, for example, when the label is pushed into the reinforcing layer before hardening to embed at least a part of the label into the reinforcing layer before hardening, the fiber of the reinforcing layer before hardening may be easily pushed aside by the label. In this manner, it is possible to embed at least a part of the label in the reinforcing layer before hardening more easily.

The present disclosure may be achieved by various aspects other than the above-described tank and tank manufacturing method. For example, the present disclosure may be achieved by the aspects of a fuel cell system including a tank filled with hydrogen gas, a tank-mounted vehicle, and the like.

What is claimed is:

1. A tank manufacturing method, comprising:
   (a) winding fiber impregnated with a thermosetting resin on a liner to form a reinforcing layer before hardening;
   (b) embedding at least a part of a label into the reinforcing layer before hardening;
   (c) winding glass fiber impregnated with a thermosetting resin before hardening so as to cover the label to form a surface layer before hardening, wherein (a) comprises:
(a1) forming an inner layer before hardening, and
(a2) forming an outer layer before hardening that has a cover rate lower than the inner layer before hardening and lower than 100%, the cover rate being a percentage of a volume occupied by the fiber impregnated with the thermosetting resin in a space of the reinforcing layer before hardening, and that is arranged on the inner layer before hardening, and
(b) comprises:
  (b1) arranging the label on the reinforcing layer before hardening, and
  (b2) embedding at least a part of the label into the reinforcing layer before hardening with the glass fiber wound on the label at (c), wherein
    (b2) comprises making tension added to the glass fiber when the glass fiber is wound on the label higher than tension added to the glass fiber when the glass fiber is wound on another part different from the label.

2. The tank manufacturing method in accordance with claim 1, wherein a thickness of the outer layer before hardening formed in (a2) is larger than a thickness of the label.

3. The tank manufacturing method in accordance with claim 1, wherein
  (b) is embedding the label into the reinforcing layer before hardening until a surface of the label is positioned on a substantially same surface as a surface of a surrounding reinforcing layer before hardening positioned around the label embedded in the reinforcing layer before hardening.

4. The tank manufacturing method in accordance with claim 1, wherein the label embedded in the reinforcing layer before hardening by (b) is formed of metal.

5. The tank manufacturing method in accordance with claim 1, wherein the outer layer before hardening is formed by a combination of helical winding and hoop winding.

* * * * *